(12) United States Patent
Ikeyama

(10) Patent No.: US 12,344,108 B2
(45) Date of Patent: Jul. 1, 2025

(54) VEHICLE POWER SUPPLY DEVICE

(71) Applicant: TOYOTA JIDOSHA KABUSHIKI KAISHA, Toyota (JP)

(72) Inventor: Toshio Ikeyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 18/403,071

(22) Filed: Jan. 3, 2024

(65) Prior Publication Data

US 2024/0262225 A1 Aug. 8, 2024

(30) Foreign Application Priority Data

Feb. 6, 2023 (JP) .................................. 2023-016110

(51) Int. Cl.
| | | |
|---|---|---|
| *B60L 53/22* | (2019.01) | |
| *B60L 50/60* | (2019.01) | |
| *H02J 7/00* | (2006.01) | |
| *H02J 7/14* | (2006.01) | |
| *H02P 27/06* | (2006.01) | |

(52) U.S. Cl.
CPC .............. *B60L 53/22* (2019.02); *B60L 50/60* (2019.02); *H02J 7/00304* (2020.01); *H02J 7/0063* (2013.01); *H02J 7/00712* (2020.01); *H02J 7/14* (2013.01); *H02P 27/06* (2013.01); *H02J 2207/20* (2020.01)

(58) Field of Classification Search
CPC ...... B60L 53/22; B60L 50/60; H02J 7/00304; H02J 7/14; H02J 2207/20; H02P 27/06
See application file for complete search history.

(56) References Cited

U.S. PATENT DOCUMENTS

| | | | |
|---|---|---|---|
| 7,932,633 B2 * | 4/2011 | King ....................... | B60L 53/14 |
| | | | 307/45 |
| 2010/0096926 A1 * | 4/2010 | King ....................... | B60L 53/20 |
| | | | 307/45 |
| 2019/0106002 A1 | 4/2019 | Götz et al. | |
| 2019/0157969 A1 * | 5/2019 | Nishibata ............... | H03K 17/18 |
| 2024/0048083 A1 * | 2/2024 | Kazaoka ................ | B60L 58/25 |

FOREIGN PATENT DOCUMENTS

JP 2011-069686 A 4/2011

\* cited by examiner

*Primary Examiner* — Jared Fureman
*Assistant Examiner* — Duc M Pham
(74) *Attorney, Agent, or Firm* — Oliff PLC

(57) ABSTRACT

A vehicle power supply device applied to a vehicle including an electric motor including coils for a plurality of phases. The vehicle power supply device includes: a battery; a power conversion device including, for each of phases of the electric motor, a switching element and a current sensor; and a control device configured to control the power conversion device such that electric power supplied via a neutral point of the electric motor is stepped up and then supplied to the battery, execute a feedback control to control currents of the respective phases such that an input current from the external power supply and an output current to the battery are equal, set an upper limit of the currents of the respective phases based on a maximum value of the input current, and limit the currents of the respective phases so as not to exceed the set upper limit value.

3 Claims, 4 Drawing Sheets

VEHICLE POWER SUPPLY DEVICE

CROSS-REFERENCE TO RELATED APPLICATION

This application claims priority to Japanese Patent Application No. 2023-016110 filed on Feb. 6, 2023, incorporated herein by reference in its entirety.

BACKGROUND

1. Technical Field

The present disclosure relates to a vehicle power supply device applied to a vehicle that can be externally charged.

2. Description of Related Art

Japanese Unexamined Patent Application Publication No. 2011-069686 (JP 2011-069686 A) discloses an abnormality determination device of a battery. The abnormality determination device determines whether a current sensor that detects a current of the battery has an intermediate value sticking abnormality. The determination is performed based on an integrated value of the current and a deviation of a voltage of the battery.

SUMMARY

As one method of external charging of a battery mounted on the vehicle, there is a neutral point charging method in which an external power supply is connected to a neutral point of an electric motor for vehicle traveling. Then, in a vehicle power supply device adopting the method, the following feedback control of each phase current may be performed. The feedback control controls each phase current of the electric motor by controlling a switching element of a power conversion device so that an input current from the external power supply and an output current to the battery are equal.

When an abnormality (sticking abnormality) regarding one of the current sensors provided for each phase of the electric motor occurs during the execution of external charging and the feedback control is performed, a circulating current is generated between the phases. As a result, a large current concentrates in the phase in which the current sensor having the abnormality is provided, and a temperature of the switching element will rise.

The present disclosure provides a vehicle power supply device capable of reducing the circulating current caused by the abnormality of the current sensor when performing the external charging using the neutral point charging method.

A vehicle power supply device according to a first aspect of the present disclosure is applied to a vehicle including an electric motor for traveling including a plurality of coils for a plurality of phases. The vehicle power supply device includes: a battery configured to supply electric power to the electric motor; a power conversion device connected in parallel with the battery, and including, for each of phases of the electric motor, a switching element and a current sensor; and a control device. The control device is configured to: control the power conversion device, during charging of the battery, such that electric power supplied from an external power supply via a neutral point of the electric motor is stepped up and then supplied to the battery; execute a feedback control to control currents of the respective phases of the electric motor by controlling the switching elements such that an input current from the external power supply and an output current to the battery are equal during the charging; during the charging, (i) set an upper limit value of the currents of the respective phases based on a maximum value of the input current; and (ii) limit the currents of the respective phases controlled by the feedback control such that the currents of the respective phases do not exceed the set upper limit value.

In the vehicle power supply device according to the first aspect of the present disclosure, the control device may be configured to stop the charging when the currents of the respective phases are limited by the upper limit value during the charging, and an absolute value of each of the currents of the respective phases exceeds a second overcurrent threshold that is smaller than a first overcurrent threshold used during traveling of the vehicle.

In the vehicle power supply device according to the first aspect of the present disclosure, the second overcurrent threshold may be a value smaller than a maximum value of a current supplied to each of the coils for the phases for driving the electric motor while the vehicle is traveling.

The vehicle power supply device according to the present disclosure, it is possible to reduce the circulating current caused by the abnormality of the current sensor when performing the external charging using the neutral point charging method.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings. Elements common to each figure are given the same reference signs, and overlapping descriptions are omitted or simplified.

1. Configuration of Vehicle Power Supply Device

Figure 1:
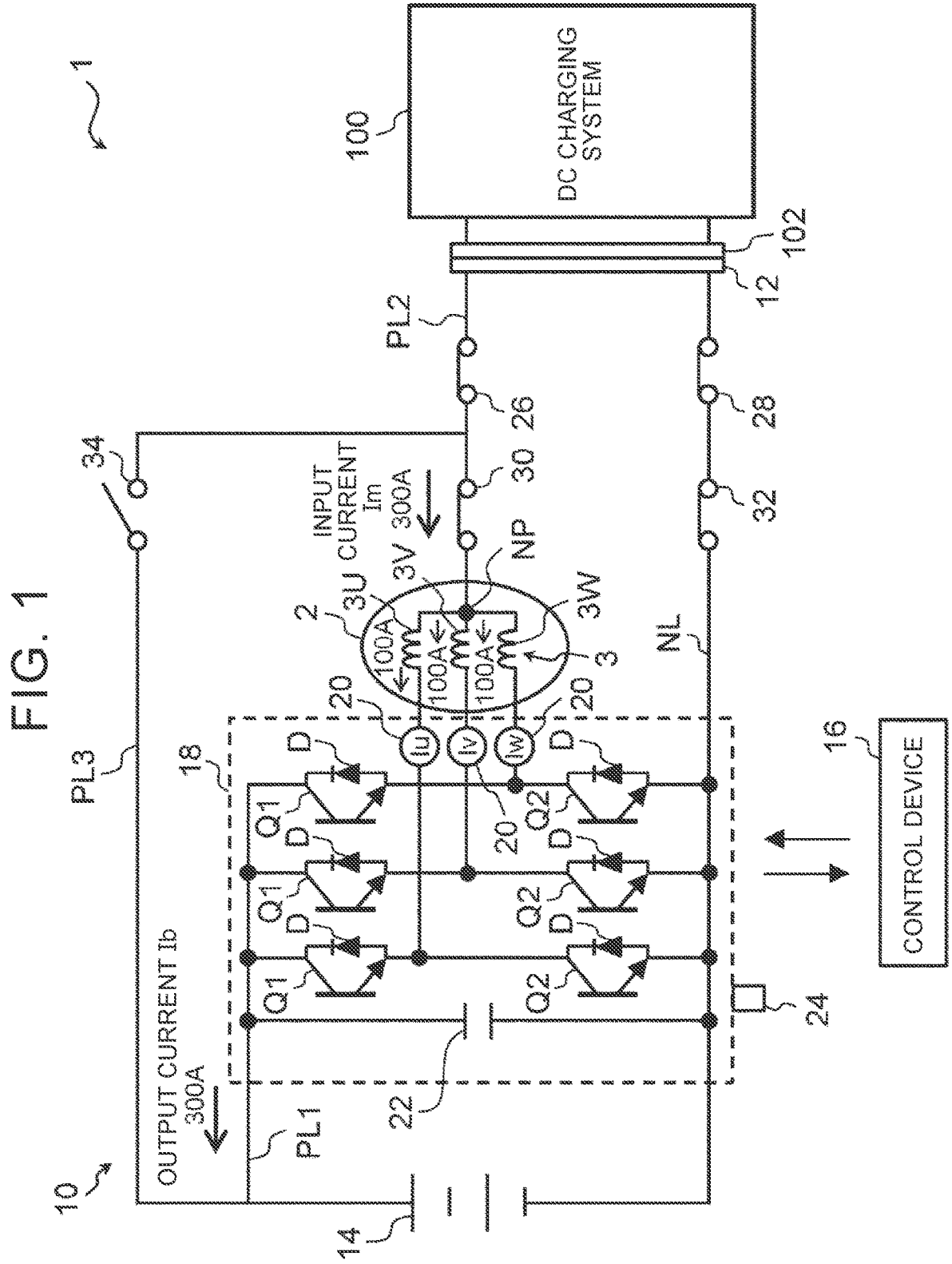
FIG. 1 is a diagram schematically showing an example of a configuration of a vehicle power supply device according to an embodiment.

FIG. 1 is a diagram schematically showing an example of a configuration of a vehicle power supply device 10 according to an embodiment. The vehicle power supply device 10 is applied to (mounted on) a vehicle 1. The vehicle 1 is a vehicle that can be charged (externally charged) with electric power from an external power supply. The vehicle 1 is, for example, a battery electric vehicle (BEV). Alternatively, the vehicle 1 may be, for example, a plug-in hybrid electric vehicle (PHEV).

The vehicle 1 includes an electric motor 2 for traveling having a coil 3 for a plurality of phases. As an example, the electric motor 2 is a three-phase electric motor and has the coil 3 for each phase, that is, a U phase coil 3U, a V phase coil 3V, and a W phase coil 3W.

The vehicle power supply device 10 includes a charging inlet 12, a battery 14, a control device 16, and a power conversion device 18.

The external power supply is, for example, a direct current (DC) charging system 100. The charging inlet 12 is connected to a charging connector 102 of the DC charging system 100 when external charging is performed. The DC charging system 100 is charging equipment such as a charging stand for supplying DC power to the vehicle 1. The battery 14 is, for example, a lithium ion battery. The battery 14 is charged with DC power supplied from the DC charging system 100 to the charging inlet 12. The vehicle 1 is driven by the electric motor 2 driven by electric power supplied from the battery 14.

The control device 16 is an electronic control unit (ECU) that includes a processor and a memory device. The control device 16 executes various controls. The various controls include control of the power conversion device 18 for driving the electric motor 2. Further, the various controls include control related to the external charging including control of the power conversion device 18. The various controls may be realized by software processing by executing a program stored in advance caused by a processor, or may be realized by hardware processing by a dedicated electronic circuit. Also, the control device 16 is configured to be able to communicate with the DC charging system 100 via a communication device (not shown).

The power conversion device 18 is also called a power control unit (PCU) 18. The PCU 18 is connected in parallel with the battery 14. The PCU 18 has a pair of switching elements Q1 and Q2 for each phase of the electric motor 2. Each switching element Q1 and Q2 is, for example, an insulated gate bipolar transistor (IGBT) with an anti-parallel diode D. Alternatively, each switching element Q1 and Q2 may be a metal oxide semiconductor field effect transistor (MOSFET) made of silicon carbide (SiC), for example. Each switching element Q1 and Q2 is controlled by a gate signal from the control device 16.

Also, the PCU 18 has a current sensor 20 for each phase of the electric motor 2. Three current sensors 20 detect each phase current Ii, that is, currents Iu, Iv, and Iw flowing through the U phase coil 3U, the V phase coil 3V, and the W phase coil 3W, respectively. Furthermore, the PCU 18 has a smoothing capacitor 22. The smoothing capacitor 22 is connected in parallel with the battery 14. The PCU 18 also includes a temperature sensor 24 that detects a temperature of a component. The component here is, for example, the switching elements Q1 and Q2.

In the U phase, the switching elements Q1 and Q2 are connected in series between a power line PL1 that is the power line on the battery 14 side, and a ground line NL. Then, the switching elements Q1 (upper arm) and Q2 (lower arm) are each connected in series to one end of the U phase coil 3U. Similarly, in the V phase, the switching elements Q1 and Q2 are connected in series between the power line PL1 and the ground line NL, and each of the switching elements Q1 and Q2 is connected in series to one end of the V phase coil 3V. In the W phase, the switching elements Q1 and Q2 are connected in series between the power line PL1 and the ground line NL, and each of the switching elements Q1 and Q2 is connected in series to one end of the W phase coil 3W.

As shown in FIG. 1, the U phase coil 3U, the V phase coil 3V, and the W phase coil 3W of the electric motor 2 are connected in a star configuration. That is, the electric motor 2 has a neutral point NP. The neutral point NP is connected to the charging inlet 12 via a power line PL2.

The vehicle power supply device 10 includes five relays 26 to 34 as an example. Electrically connecting/disconnecting of each of the relays 26 to 34 is controlled by the control device 16. Specifically, the relay 26 is disposed on the power line PL2, and the relay 28 is disposed on the ground line NL between the PCU 18 and the charging inlet 12. The relays 26 and 28 are electrically disconnected when the charging inlet 12 is not connected to the charging connector 102, and are electrically connected when the charging inlet 12 is connected to the charging connector 102. The relay 30 is disposed on the power line PL2 between the relay 26 and the neutral point NP. The relay 32 is disposed on the ground line NL between the relay 28 and the PCU 18. The relay 30 is electrically connected when the external charging is performed by a neutral point charging method, which will be described later. The relay 32 is electrically connected/disconnected, for example, in conjunction with the relay 28. In addition, the vehicle power supply device 10 includes a power line PL3. One end of the power line PL3 is connected to the power line PL2 between the relay 26 and the relay 30. The other end of the power line PL3 is connected to the power line PL1 between the positive terminal of the battery 14 and the smoothing capacitor 22. The relay 34 is disposed on the power line PL3. Electrically connecting of the relay 34 will be described later.

In the vehicle power supply device 10, when the electric motor 2 is driven for vehicle traveling, the PCU 18 controlled by the control device 16 converts DC power from the battery 14 into three-phase alternating current (AC) power and supplies the AC power to the electric motor 2. That is, in this case, the PCU 18 functions as an inverter.

On the other hand, a combination of each phase of the coil 3 of the electric motor 2 having the neutral point NP and the PCU 18 can be used as a step-up converter (step-up chopper circuit) when the external charging is performed.

Specifically, depending on a specification of the DC charging system 100 connected to the vehicle power supply device 10, a supply voltage Vs from the DC charging system 100 is not necessarily the same as a voltage Vb (for example, 800 V) of the battery 14. The supply voltage Vs is, for example, 400 V or 800 V. When the supply voltage Vs is 400 V, for example, stepping up the voltage is necessary on the vehicle power supply device 10 side for the external charging. In this case, during the external charging, the control device 16 controls the PCU 18 so that the electric power supplied from the external power supply via the neutral point NP of the electric motor 2 is stepped up and then supplied to the battery 14 (the neutral point charging method).

In order to realize charging by the neutral point charging method, as described above, the combination of each phase of the coil 3 of the electric motor 2 and the PCU 18 is used as the step-up converter. More specifically, in each phase, the on/off state of the switching elements Q1 and Q2 is controlled so that electromagnetic energy is accumulated in the coil 3 functioning as a reactor, and the accumulated electromagnetic energy is supplied to the power line PL1 (stepping up operation BO). By performing such a stepping up operation BO, when the voltage of the battery 14 is higher than the supply voltage Vs, it is possible to perform the external charging without the need for providing the step-up converter separately.

On the other hand, when the supply voltage Vs is 800 V, the external charging can be performed without the need for stepping up the voltage on the vehicle power supply device 10 side. When stepping up the voltage is not required, in the vehicle power supply device 10, during the external charging, the relay 34 along with the relays 26, 28, and 32 is electrically connected, and the relay 30 is electrically disconnected. Thus, electric power can be supplied from the DC charging system 100 to battery 14 using the power line PL3.

2. Processing During External Charging

The external charging using the DC charging system 100 is initiated upon a detection that the charging connector 102 is connected to the charging inlet 12. During the execution of external charging, the control device 16 issue a command of a current command value to the DC charging system 100 via the communication device at predetermined time intervals. The DC charging system 100 outputs a current (input current Im in FIG. 1) corresponding to the current command value received from the control device 16 (vehicle 1).

The control device 16 executes the feedback control of each phase current Iu, Iv, and Iw of the electric motor 2 (currents of the respective phases of the electric motor) so that the input current Im from the DC charging system 100 (external power supply) and an output current Ib to the battery 14 are equal during the external charging. The feedback control is realized by controlling the operation of the switching elements Q1 and Q2 for each phase so that a current of ⅓ of the input current Im flows in each phase. Each current value shown in FIG. 1 is an example. When the difference between the input current Im and the output current Ib during the external charging becomes large, the DC charging system 100 may stop the external charging. Therefore, the external charging can be appropriately continued by performing the feedback control to keep the difference small.

When a state of charge (SOC) of the battery 14 reaches a predetermined value during the external charging, or when a charging time set in advance elapses, the control device 16 sends a charging stop command to the DC charging system 100. As a result, the external charging ends.

Figure 2:
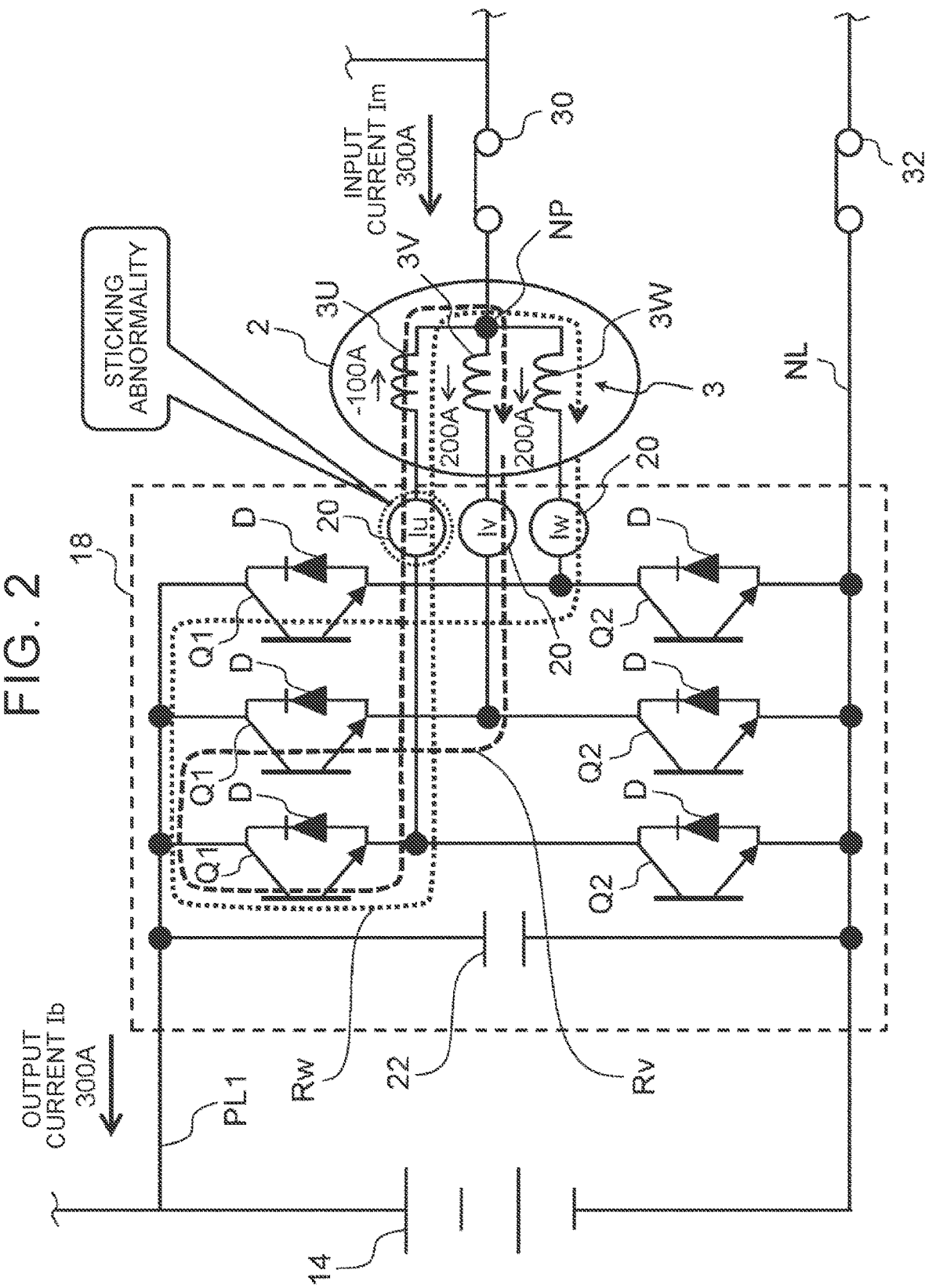
FIG. 2 is a diagram for explaining an issue during external charging using a neutral point charging method.

FIG. 2 is a diagram for explaining an issue during the external charging using the neutral point charging method. FIG. 2 is an enlarged view of the configuration around the electric motor 2 and the PCU 18 in FIG. 1. When an abnormality occurs during the execution of external charging in one of the current sensors 20 provided for each phase of the electric motor 2, a circulating current is generated between the phases when the feedback control is performed.

More specifically, the assumed abnormality here is, for example, a failure (sticking abnormality) in which the output of the current sensor 20 is fixed at a certain value. FIG. 2 shows an example of the sticking abnormality occurred in the current sensor 20 of the U phase. According to the feedback control, when the three current sensors 20 are normal and the input current Im is, for example, 300 A, the switching elements Q1 and Q2 of each phase are controlled so that each phase current Ii (i=u, v, and w) of each phase becomes 100 A in order to set the output current Ib to 300 A (see FIG. 1). On the other hand, when the current sensor 20 of the U phase with the sticking abnormality is outputting an erroneous current value different from the current of 100 A that actually flows through the U phase, by the feedback control, while the value of a U phase current Iu is regarded as the erroneous current value, the switching elements Q1 and Q2 of each phase are controlled so that the output current Ib is maintained at a value equal to the input current Im.

As a result, as shown in FIG. 2, a V phase current Iv and a W phase current Iw flow along respective current routes Rv and Rw. Each current value shown in FIG. 2 is an example. When such a circulating current occurs, a large current concentrates on the U phase for which the current sensor 20 having the sticking abnormality is provided. As a result, the temperature of the switching elements Q1 and Q2 of the U phase rises. In addition, the larger the erroneous current value output by the current sensor 20 having the sticking abnormality is, the larger the circulating current generated as described above becomes.

In addition, a detection range of the current sensor 20 is basically set assuming each phase current Ii used during normal vehicle traveling. Therefore, the upper limit value of the detection range is a large current value, such as 1000 A. Therefore, when the sticking abnormality occurs such that the current sensor 20 erroneously outputs the upper limit value of the detection range, the above circulating current increases.

Figure 3:
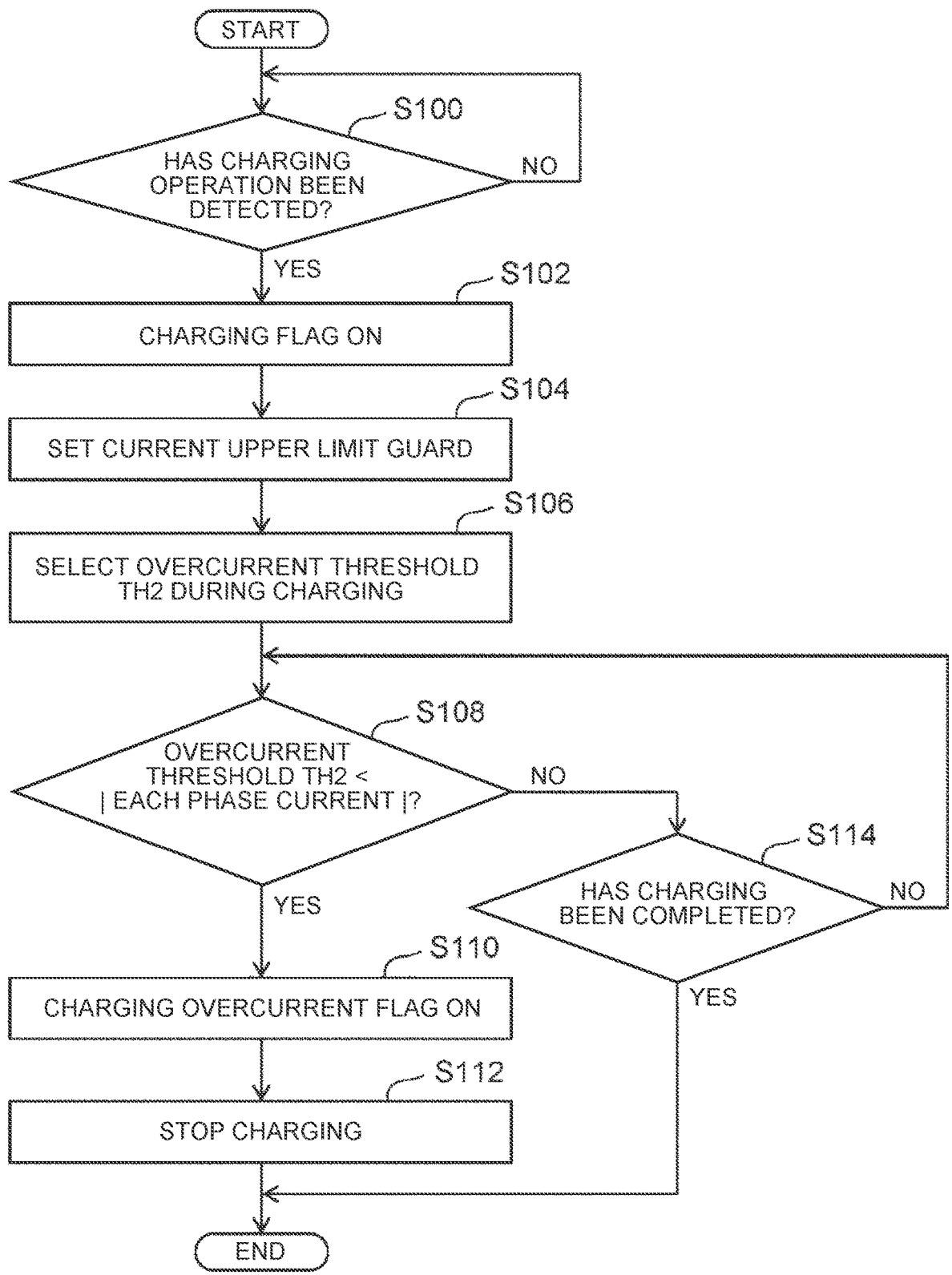
FIG. 3 is a flowchart showing a flow of processing during the external charging according to the embodiment.

In the present embodiment, the control device 16 performs the following processing during the external charging using the neutral point charging method. FIG. 3 is a flowchart showing a flow of processing during the external charging according to the embodiment. The processing of the flowchart is executed by a processor of the control device 16, for example.

In step S100, the control device 16 determines whether an operation to perform the external charging using the neutral point charging method has been performed. Specifically, for example, the determination result is Yes when the control device 16 detects the connection of the charging connector 102 to the charging inlet 12. As a result, the process proceeds to step S102, and the control device 16 sets a charging flag to ON. Note that the charging flag is set to OFF when the external charging ends (including when the external charging is completed).

In step S104 following step S102, the control device 16 sets a current upper limit guard. Specifically, the control device 16 sets an upper limit value Ilmt for each phase current Ii of each phase. Then, the control device 16 limits each phase current Ii of each phase controlled by the feedback control so as not to exceed the set upper limit value Ilmt.

The upper limit value Ilmt is determined in advance as a value based on a maximum value (maximum current value Imax2) of the input current (charging current) Im. The maximum current value Imax2 is a maximum value within a range of the input current Im used during the execution of external charging, and is determined in advance. More specifically, the upper limit value Ilmt corresponds to a value obtained by dividing the maximum current value Imax2 by the number of phases (for example, 3) of the electric motor 2, and adding a predetermined allowance to the result of the division. The allowance is determined, for example, in consideration of various variation factors of the vehicle power supply device 10, such as a variation in a circuit that configures the PCU 18. As an example, when the maximum current value Imax2 is 300 A, the upper limit value Ilmt is determined as 150 A, for example, by adding 50 A as an allowance to 100 A that corresponds to ⅓ of 300 A.

In step S106 following step S104, the control device 16 selects an overcurrent threshold TH2 (second overcurrent threshold) during charging. The overcurrent threshold here is a value for determining whether the overcurrent is occurring as each phase current Ii. In other words, in step S106, by starting the external charging, the control device 16 changes the overcurrent threshold from an overcurrent threshold TH1 (first overcurrent threshold) used while the vehicle is traveling to the overcurrent threshold TH2.

Figure 4:
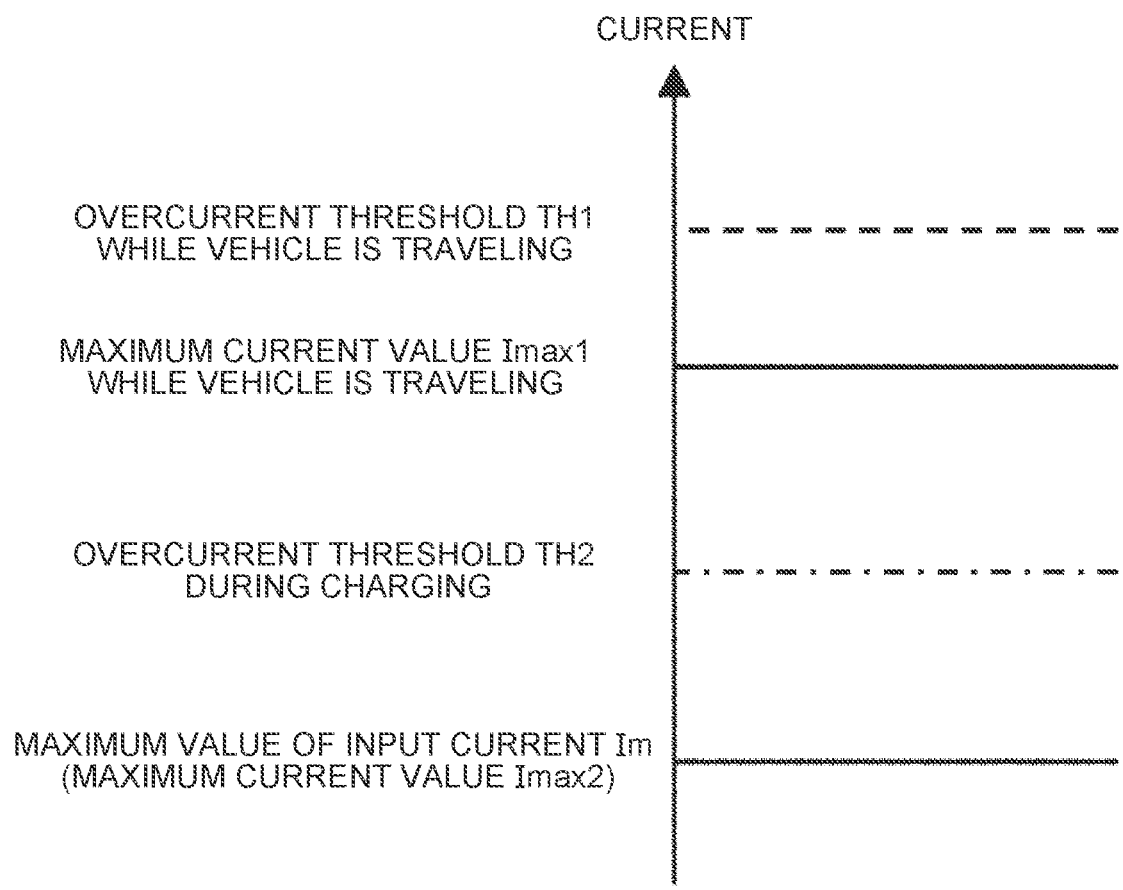
FIG. 4 is a diagram for explaining an overcurrent threshold TH2 during charging according to the embodiment.

FIG. 4 is a diagram for explaining the overcurrent threshold TH2 during charging according to the embodiment. A maximum current value Imax1 in FIG. 4 is a maximum value of a current supplied to each coil of the three-phase coil 3 for driving the electric motor 2 while the vehicle is traveling, in other words, the maximum current value Imax1 corresponds to a maximum value of a current used for driving the electric motor 2. The maximum current value Imax1 is, for example, 1000 A. The maximum current value Imax2 is the maximum value of the input current (charging current) Im as described above, and is 300 A, for example. Thus, a current usage range differs between when the vehicle is traveling and when the vehicle is being externally charged.

The overcurrent threshold TH1 used while the vehicle is traveling is determined in advance as a value that is larger than the maximum current value Imax1 by a predetermined amount. On the other hand, the overcurrent threshold TH2 used during charging is determined in advance as a value larger than the maximum current value Imax2 by a predetermined amount and smaller than the overcurrent threshold TH1. More specifically, the overcurrent threshold TH2 is determined in advance as a value smaller than the maximum current value Imax1. In addition, the overcurrent threshold TH2 is larger than the upper limit value Ilmt.

In step S108 following step S106, the control device 16 determines whether the absolute value of each phase current Ii of each phase is larger than the overcurrent threshold TH2. When the determination result is Yes, the control device 16 determines that the overcurrent is occurring in a phase for which the condition is satisfied, and sets a charging overcurrent flag to ON (step S110). Moreover, when the determination result of step S108 is No, the process proceeds to step S114.

In step S112 following step S110, the control device 16 stops the external charging. That is, the control device 16 sends the charging stop command to the DC charging system 100.

In step S114, the control device 16 determines whether the external charging has been completed. As a result, when the external charging has not been completed (step S114; No), the process returns to step S108. On the other hand, when the external charging has been completed (step S114; Yes), the processing of the flowchart ends.

3. Effect

As described above, according to the present embodiment, the upper limit value Ilmt of each phase current Ii is set based on the maximum current value Imax2 of the input current Im during the external charging using the neutral point charging method. Then, the control device 16 limits each phase current Ii of each phase controlled by the feedback control so as not to exceed the set upper limit value Ilmt.

As a result, when an abnormality (sticking abnormality) occurs in one of the current sensors 20 corresponding to the respective three phases, it is suppressed that each phase current Ii is controlled inappropriately by the feedback control affected by the output of the current sensor 20 in which the abnormality has occurred. Therefore, the circulating current caused by the abnormality of the current sensor 20 can be reduced. In addition, since the maximum current value Imax2 of the input current (charging current) Im is determined in advance, the maximum value of each phase current Ii that actually flows when the external charging is normally performed is also determined according to the maximum current value Imax2. Therefore, by determining the upper limit value Ilmt based on the maximum current value Imax2 as in the present embodiment, the upper limit value Ilmt can be appropriately determined in consideration of the intensity of each phase current Ii that can actually flow.

Further, according to the present embodiment, the external charging is stopped when each phase current Ii is limited by the upper limit value Ilmt during the execution of external charging, and the absolute value of each phase current Ii exceeds the overcurrent threshold TH2 that is smaller than the overcurrent threshold TH1 used while the vehicle is traveling. As shown in FIG. 4, the current usage range differs between when the vehicle is traveling and when the vehicle is being externally charged. Therefore, when the same overcurrent threshold TH1 as that used during the vehicle traveling is used during the external charging, detecting the overcurrent becomes difficult because each phase current Ii is limited low by the upper limit value Ilmt. Conversely, when the same overcurrent threshold TH2 as that used during the external charging is used during the vehicle traveling, an erroneous determination will be made that the overcurrent is occurring when each phase current Ii is appropriately flowing. Such an erroneous determination may lead to a stop of vehicle traveling. In contrast, according to the present embodiment, the overcurrent threshold TH2 suitable for using during the external charging is used to appropriately determine the overcurrent that occurs during the external charging. Then, when the overcurrent is detected, the external charging is stopped so that components of the PCU 18 such as the switching elements Q1 and Q2 can be properly protected. In addition, as shown in FIG. 4, the overcurrent threshold TH2 is a value smaller than the maximum current value Imax1 while the vehicle is travelling. Also in this respect, the overcurrent threshold TH2 can be appropriately determined for use during the external charging.

In the above-described embodiment, the vehicle power supply device 10 applied to the vehicle 1 including the electric motor 2 for traveling including the three-phase coil 3 has been described as an example. However, the "vehicle power supply device" according to the present disclosure may be applied to a vehicle including an electric motor for traveling including a coil for phases that are more than three phases.

What is claimed is:

1. A vehicle power supply device applied to a vehicle including an electric motor for traveling including a plurality of coils for a plurality of phases, the vehicle power supply device comprising:
   a battery configured to supply electric power to the electric motor;
   a power conversion device connected in parallel with the battery, and including, for each of phases of the electric motor, a switching element and a current sensor; and
   a control device configured to
      control the power conversion device, during charging of the battery, such that electric power supplied from an external power supply via a neutral point of the electric motor is stepped up and then supplied to the battery,
      execute a feedback control to control currents of the respective phases of the electric motor by controlling the switching elements such that an input current from the external power supply and an output current to the battery are equal during the charging,
      during the charging, (i) set an upper limit value of the currents of the respective phases based on a maximum value of the input current, and (ii) limit the currents of the respective phases controlled by the feedback control such that the currents of the respective phases do not exceed the set upper limit value.

2. The vehicle power supply device according to claim 1, wherein the control device is configured to stop the charging when the currents of the respective phases are limited by the upper limit value during the charging, and an absolute value of each of the currents of the respective phases exceeds a second overcurrent threshold that is smaller than a first overcurrent threshold used during traveling of the vehicle.

3. The vehicle power supply device according to claim 2, wherein the second overcurrent threshold is a value smaller than a maximum value of a current supplied to each of the coils for the phases for driving the electric motor while the vehicle is traveling.

* * * * *